(12) United States Patent
Goetzen et al.

(10) Patent No.: US 6,293,561 B1
(45) Date of Patent: Sep. 25, 2001

(54) CONTROLLABLE WHEEL SUSPENSION SYSTEM FOR AN ACTIVE RUNNING GEAR OF A MOTOR VEHICLE

(75) Inventors: Hartmut Goetzen, Weinstadt; Ulrich Hipp, Wernau; Avshalom Suissa, Renningen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/622,158

(22) PCT Filed: Nov. 27, 1999

(86) PCT No.: PCT/EP99/09237

§ 371 Date: Oct. 30, 2000

§ 102(e) Date: Oct. 30, 2000

(87) PCT Pub. No.: WO00/35737

PCT Pub. Date: Jun. 22, 2000

(30) Foreign Application Priority Data

Dec. 12, 1998 (DE) .............................................. 198 57 394

(51) Int. Cl.[7] .................................................. B60G 17/01
(52) U.S. Cl. ...................... 280/5.52; 280/5.5; 280/86.75; 280/86.757; 701/37
(58) Field of Search ..................................... 280/5.5, 5.52, 280/5.521, 86.75, 86.751, 86.758, 86.757; 701/37, 38

(56) References Cited

U.S. PATENT DOCUMENTS

| | | | |
|---|---|---|---|
| 4,700,972 | 10/1987 | Young | 280/707 |
| 5,165,715 | * 11/1992 | Sakamoto et al. | 280/707 |
| 5,188,390 | * 2/1993 | Clark | 280/707 |
| 5,438,514 | * 8/1995 | Kakizaki et al. | 364/424.05 |
| 5,627,751 | * 5/1997 | Davis et al. | 364/424.034 |
| 5,999,868 | * 12/1999 | Beno et al. | 701/37 |

FOREIGN PATENT DOCUMENTS

| | | |
|---|---|---|
| 37 36 229 A1 | 9/1988 | (DE) . |
| 44 38 929 C1 | 10/1995 | (DE) . |
| 2 271 968 A | 5/1994 | (GB) . |
| 62125907 | 6/1987 | (JP) . |
| 06183242 | 7/1994 | (JP) . |
| 10264636 | 6/1998 | (JP) . |

* cited by examiner

Primary Examiner—Eric Culbreth
Assistant Examiner—L. Lum
(74) Attorney, Agent, or Firm—Crowell & Moring LLP

(57) ABSTRACT

A regulatable suspension system for an active chassis of a motor vehicle has at least two actuators which are capable of being set via actuating signals in order to influence the relative movement between a wheel of the motor vehicle and the vehicle body. A control unit is provided for generating the actuating signals as a function of input signals representing vehicle state variables. Actuating movements that can be applied to the wheel by the actuators and acting on the wheel have parallel direction components. In the event of a fault, if one actuator is defective, actuating signals coupling the actuators can be generated in such a way that a control function assigned to the defective actuator can be set via an intact actuator.

20 Claims, 9 Drawing Sheets

CONTROLLABLE WHEEL SUSPENSION SYSTEM FOR AN ACTIVE RUNNING GEAR OF A MOTOR VEHICLE

BACKGROUND AND SUMMARY OF THE INVENTION

This application claims the priority of PCT International Application No. PCT/EP99/09237, filed Nov. 27, 1999 and German patent document 198 57 394.4, filed Dec. 12, 1998, the disclosures of which is expressly incorporated by reference herein.

The invention relates to a regulatable suspension system for an active chassis of a motor vehicle.

German patent document DE 44 38 929 C1 discloses a hydraulic steering actuator for a parameter-dependently controlled vehicle steering arrangement, comprising a steering lever which is arranged on a steerable wheel and which is connected to the piston rod of a hydraulic steering actuator. The steering actuator is set by means of actuating signals which are generated in a computer as a function of various parameters, for example the rotary position of the steering wheel, the traveling speed or the yaw velocity of the vehicle. The steering actuator can be set in a regulated manner as a result of a desired-value/actual-value comparison between measured and calculated state variables.

Furthermore, various kinds of suspension systems for motor vehicles are known, which comprise a plurality of components, such as spring, damper and links, and which make it possible to influence the possible movements of the wheel, in particular steering angle, stroke, camber and toe in an active or passive manner as intended.

For safety reasons, the greatest possible functioning capacity of the components determining the steering must be ensured. Particularly in the case of drive-by-wire systems, in which there is no direct mechanical transfer of the driver's steering movement to the steered wheels, an operating failure in the steering transmission path must be remediable by means of a usually redundant design. This results, however, in increased production, assembly and operating costs of the suspension systems; moreover, redundantly designed suspension systems require more construction space.

One object of the invention is to provide a regulatable suspension system for an active chassis, which ensures a high degree of safety and flexibility in a simple manner.

This and other objects and advantages are achieved by the suspension system according to the invention, in which redundancy is achieved by providing at least two actuators that act upon the wheel and generate actuating movements or actuating vectors which have parallel direction components. This is achieved by providing an angle other than 90° between the actuating directions of the two actuators, so that the effective directions of the two actuators are at least partially superposed on one another. Thus, when there is a fault due to a defect of one actuator, the function of the latter can be at least partially performed by the second actuator.

The operating state of the actuators is checked regularly via a control unit and, when a failure of one actuator is detected, actuating signals acting upon the remaining (intact) actuator are generated. These actuating signals cause the intact actuator to perform the function of the defective actuator, by intensifying the actuating movement of the intact actuator or to adapting it in the effective direction of the defective actuator until the function of the defective actuator is performed completely or partially.

This novel concept achieves a reduction of the number of components in the suspension system, because it is no longer necessary to provide a replacement actuating element for each actuator in order to ensure the necessary operating reliability. Instead, it is possible to achieve redundancy for a plurality of actuators using only a single additional actuator which performs additional functions that correspond to the primary functions of the other actuators. Furthermore, a graded safety strategy can be implemented, in which only those actuators that are particularly relevant to safety are protected redundantly.

In one embodiment of the invention, the actuating direction of the additional actuator has a direction component which runs parallel to the actuating direction of at least two further actuators. In the event of a fault, the additional actuator can perform the function of the defective actuator, so that it is possible to ensure a safeguard against the operating failure of at least two actuators, by means of only one additional actuator.

In another expedient version, in the event of a fault an actuator which sets a less safety-relevant function of the suspension system also performs the function of a defective actuator that is more important in safety terms. And if appropriate, it can also be taken into account that the intact actuator can no longer (or no longer completely) perform its original function. For example, it is possible to cause a defective steering function of one actuator to be performed by a further actuator which is responsible primarily for setting the camber or the toe of the wheel. The actuator performing the steering function generates an actuating movement with a direction component which is parallel to the actuating direction of the defective actuator responsible primarily for steering. By means of the control, the intact actuator can be activated so that the direction component influencing the steering is as pronounced, or at least approximately as pronounced, as the actuating movement of the steering actuator. Thus, the steering function can continue to be exercised without any safety restriction.

When the function of a defective actuator is assumed by an actuator that is used primarily for another function, the number of all the actuators used corresponds to the number of influenceable possibilities for the movement of the wheel. No additional actuators are required in this version, yet a redundant design is achieved due to function assumption.

It may be expedient, if appropriate, to design two or more actuators such that, in the event of a fault, mutual function assumption is possible. In this general case, when all the actuators are fully operational, the actuating movements of the actuators are normally uncoupled, so that each actuator performs only the primary function assigned to it. In the event of a fault, if there is a partial or complete failure of one or more actuators, the functions of the intact actuators are coupled, while their main functions either continue to be performed at least approximately or are relinquished in favor of the more important functions of the defective actuators. The uncoupling and coupling of the actuators is carried out with the aid of the actuating signals which are generated in the control.

In a preferred embodiment, the force application points of two cooperating actuators are arranged in each case at a distance from the steering axis, so that both actuators can influence the steering angle. If one of the actuators fails, the remaining actuator can be used for steering.

Advantageously, the force application points of the two actuators are also at a distance from a further wheel rotation axis, so that both can generate a torque acting about this wheel rotation axis, in order to set a further degree of freedom of the wheel; in particular camber or toe. If one actuator fails, the remaining operational actuator can assume the steering function, if appropriate with the function for setting the additional degree of freedom of the wheel being reset.

Other objects, advantages and novel features of the present invention will become apparent from the following detailed description of the invention when considered in conjunction with the accompanying drawings.

DETAILED DESCRIPTION OF THE DRAWINGS

In the exemplary embodiments illustrated in FIGS. 1 to 12, identical components are given the same reference symbols. Wheel rotation is presumed hereafter to be self-evident and is not included as an independent degree of freedom. Vertical compression usually also results in a damping of the vertical movement of the wheel. In all the exemplary embodiments, there is a control unit for generating actuating signals acting upon the actuators.

Figure 1:
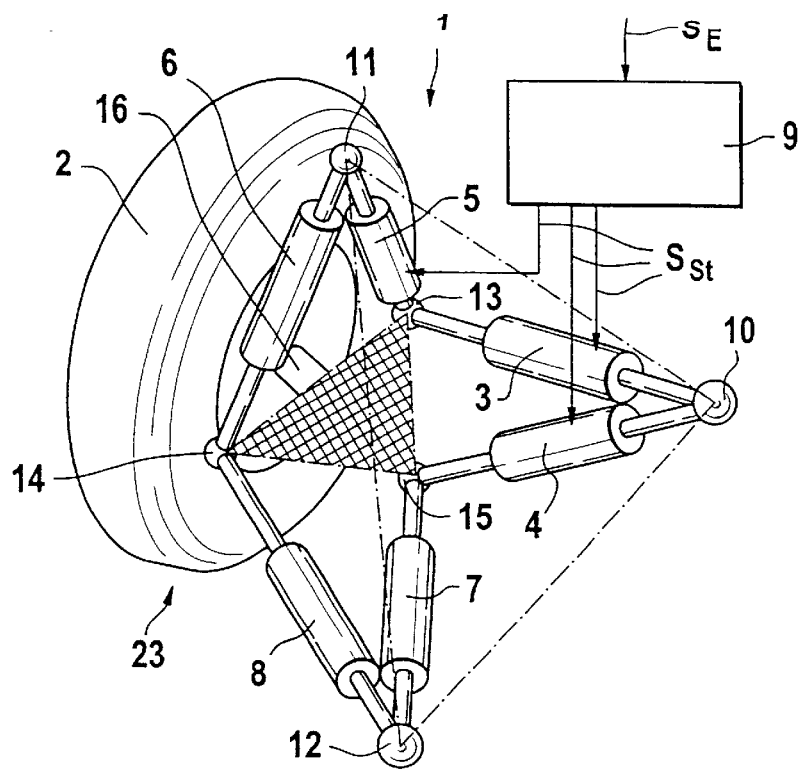
FIG. 1 is a perspective view of a wheel module with a plurality of actuators.

The wheel module or suspension system 1, shown in FIG. 1, for a wheel 2 is part of an active regulatable chassis in a motor vehicle. The suspension system comprises a plurality of actuators 3 to 8 which are combined into a spatial system and act upon the wheel 2 or the wheel carrier of the wheel 2. The actuators 3 to 8, which are designed as translationally acting piston/cylinder adjustment devices, are set to a desired position, via actuating signals $S_{St}$ generated in a control unit 9 according to predetermined control instructions, as a function of input signals $S_E$. The latter are recorded, for example, by measurement transducers and represent state variables and operating variables of the motor vehicle.

The six actuators 3 to 8 form a spatial hexapod and make it possible to implement a total of six degrees of freedom of the wheel: steering, compression, camber setting, toe setting and wheel-base change (both longitudinally and transversely). Each of the actuators is connected to the vehicle body at its end remote from the wheel carrier, with pairs of actuators (3-4, 5-6 and 7-8) being fastened at common fastening point 10, 11, 12. Each common fastening point 10, 11 or 12 combines with two of the opposite force application points (13-15, 13-14 and 14-15) of the associated actuators to form a triangle (10-13-15, 11-14-13 and 12-15-14). Adjacent pairs of actuators (3-5, 6-8 and 4-7) share a common force application point 13, 14, 15 with the actuating direction of adjacent actuators at a common force application point differing according to the angle formed between two actuators.

In each case two actuators suspended at a common fastening point lie in a common plane; the actuators suspended at different fastening points lie in different planes. The plane of the actuators 5, 6 runs at a slight inclination to the vertical. The force application points 13, 14 of the actuators 5, 6 lie, directly adjacent to the wheel 2, in an approximately horizontal line; the force application points 13, 14 are at a lateral distance from the wheel axle 16 and at a vertical distance from the wheel contact point 23.

The force application point 15 of the actuators 4 and 7 is located at a horizontal distance from the wheel body on the wheel axle 16. The three force application points 13, 14, 15 form the triangle, depicted by hatching, which runs approximately horizontally slightly above the wheel axle 16. The three planes, which are formed in each case by two actuators suspended at a common fastening point, limit three sides of a tetrahedron.

The degrees of freedom which can be executed by means of this configuration are: steering, compression, camber setting, toe increase and wheel-base change. All six of these functions can be exercised simultaneously when all six actuators 3 to 8 are operational. With the aid of the actuating signals $S_{St}$ generated in the control unit 9, the functioning of the individual actuators is coordinated in such a way that, in spite of the common force application points, uncoupling of the degrees of freedom is achieved during normal operation when the actuators are fully operational, so that the degrees of freedom can be activated without influencing one another.

In the case of a defective actuator, such actuator is detained in its current position or in a convenient position in terms of energy, for instance in its central position, which position is even kept under the influence of external forces. The defective actuator then assumes the function of a fixed transmission rod. The defective actuator may be detained, for example, by means of an electric motor having a self-locking worm gear.

It may also be expedient, however, to refrain from any detention of a defective actuator and to cause it to slide under the influence of external forces.

In the event of a fault, even if there is a failure of one or more actuators, the steering, compression and camber-setting functions can still be performed. Since each actuator has an actuating direction with force components perpendicular to the steering plane containing the steering axis, it is possible, even if five actuators fail, to carry out wheel steering by means of any one intact actuator only. By virtue of the spatial arrangement in which each actuator assumes in relation to the wheel 2 an actuating direction deviating from that of the adjacent actuators, and has a direction component parallel to each adjacent actuator, it is possible to implement the steering, compression and camber-setting functions by means of any three intact actuators only, the remaining degrees of freedom being relinquished. As a result, overall, a considerable safety reserve is obtained. Moreover, there remains, as a rule, at least a diminished capacity to influence the other relinquished degrees of freedom.

Figure 2:
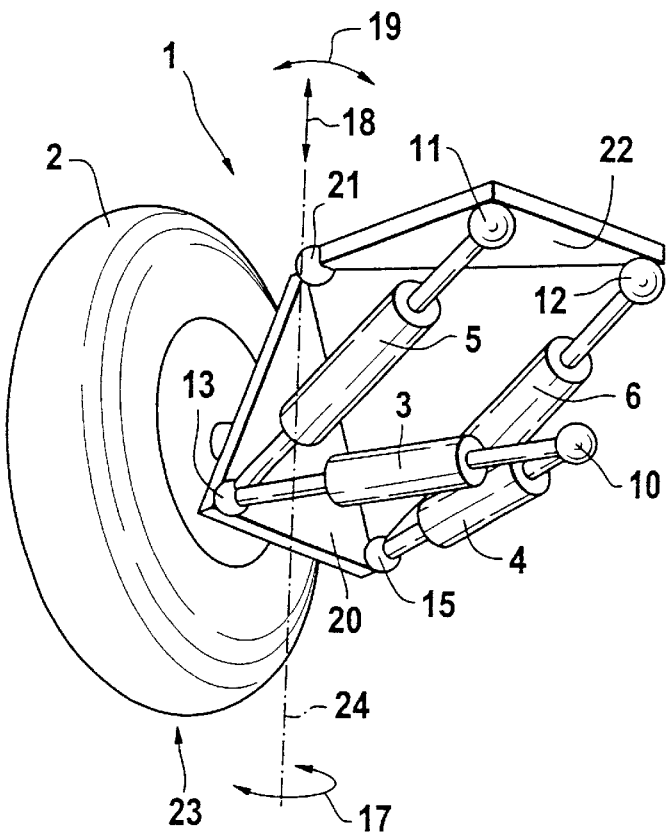
FIGS. 2 to 12 to show further exemplary embodiments of wheel modules with different numbers of actuators or different actuator arrangements.

FIG. 2 illustrates a further exemplary embodiment of a suspension system 1 for a wheel 2 with altogether four actuators 3 to 6, by means of which the four degrees of freedom comprising steering, compression, camber setting and toe setting can be influenced; in the figure, the movement arrows 17, 18 and 19 illustrate the possible steering, compression and camber-setting movements of the wheel 2.

The four actuators 3 to 6 are arranged spatially in the same way as in the preceding embodiment. In each case two actuators 3, 5 and 4, 6 terminate at a common wheel-side force application point 13 and 15, the two force application points 13, 15 at the same time forming, together with a further point of articulation 21, corner points of a steering triangle 20 which is arranged on the wheel side and which transmits the actuating movements of the actuators 3 to 6 to the wheel 2. The steering triangle 20 runs approximately vertically and lies approximately parallel to the wheel rotation plane. The two force application points 13 and 15 are located at a lateral distance from the steering axis 24 and at a vertical distance from the wheel contact point 23.

The two actuators 3 and 4 with the lower force application points 13 and 15 have a common body-side fastening point 10, run approximately horizontally and form a common angle.

The two actuators 5 and 6 lie approximately parallel to one another; they are suspended on the body side, via two fastening points 11, 12, to a further approximately horizontal steering triangle 22, the third corner point of which is identical to the point of articulation 21 of the first steering triangle 20. The fastening points 11, 12 are located above the fastening points 10 of the actuators 3 and 4. The actuators 5 and 6 lie obliquely in the suspension system 1, and the actuating directions of the actuators 5 and 6 are identical to one another, but differ from the actuating directions of the other two actuators 3, 4. Since the actuating direction of the actuators 5, 6 forms with the actuating direction of the actuators 3, 4 an angle other than 90°, a directional component of the actuating direction of each actuator 5, 6 coincides with a direction component of the actuating direction both of the actuator 3 and of the actuator 4.

In the event of a failure of an actuator, detected by a control unit (not shown), the faulty actuator is deactivated, so that the piston can slide freely in the cylinder of the actuator. As long as at least one actuator is still intact, at least the steering function can continue to be performed in the event of a fault.

Figure 3:
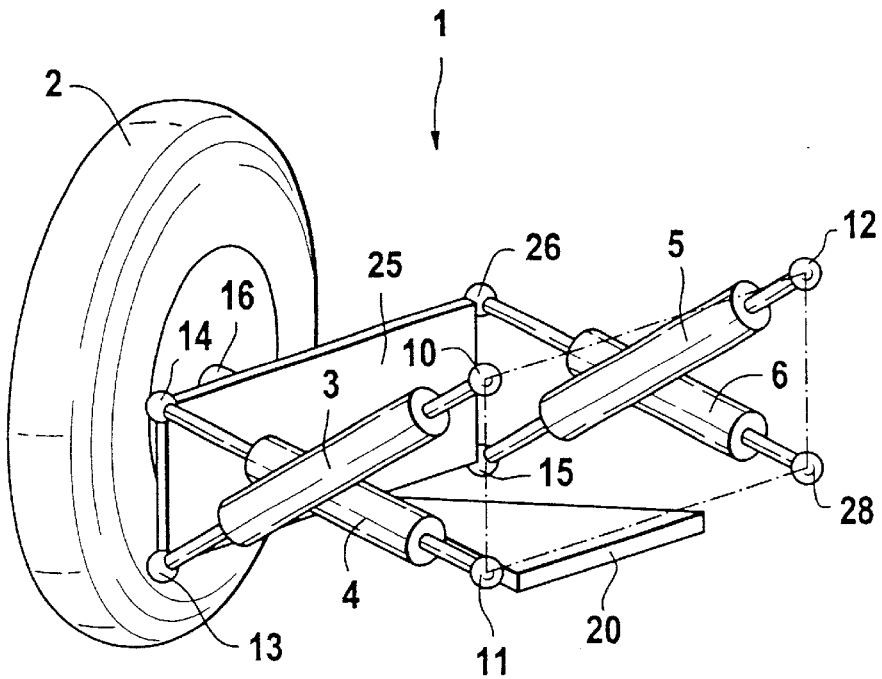
Figure 3A:
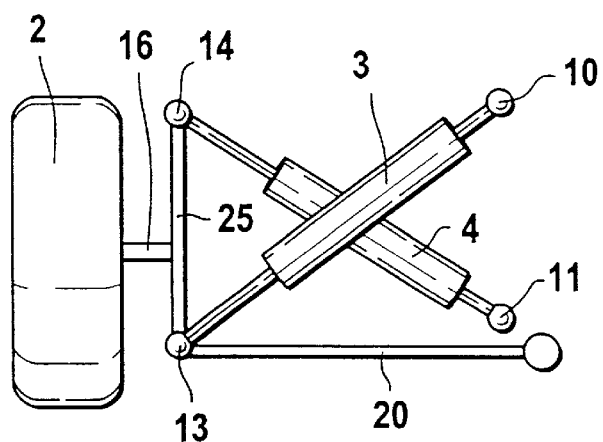
Figure 3B:
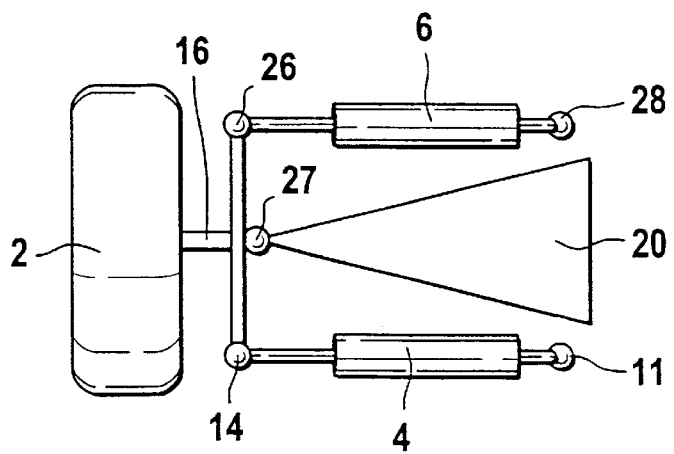

FIGS. 3, 3a and 3b illustrate a further exemplary embodiment. FIG. 3 is a perspective view, while FIG. 3a is a side view and FIG. 3b a top view of the exemplary embodiment. The suspension system 1 of the wheel 2 comprises a total of four actuators 3 to 6 which are suspended on the body at four different fastening points 10, 11, 12, 28 and are connected to a wheel-side link 25 via four different force application points 13, 14, 15, 26. Both the force application points and the fastening points of the actuators in each case form a rectangle. In each case two mutually spaced actuators 3-5 and 4-6 lie parallel to one another; actuators 3-4 and 5-6, with fastening points and force application points located approximately vertically one above the other, are at an angle to one another. A steering triangle 20 is also provided, which runs approximately horizontally and is connected to the wheel axle 16 and to the link 25 via a point of articulation 27.

The suspension system possesses a total of the three degrees of freedom comprising steering, compression and camber setting. Since the number of actuators exceeds the number of degrees of freedom, the system has a redundant design. Normally, on account of the redundant design, the surplus actuator can be used for force regulation, in order to prevent distortions which may be caused by actuators running asynchronously.

If only one actuator fails, the defective actuator is put into a sliding position, and all the degrees of freedom can be executed without adversely affecting one another. If two actuators fail, the steerability of the system can be preserved, but with the compression and camber-setting functions being coupled.

Figure 4:
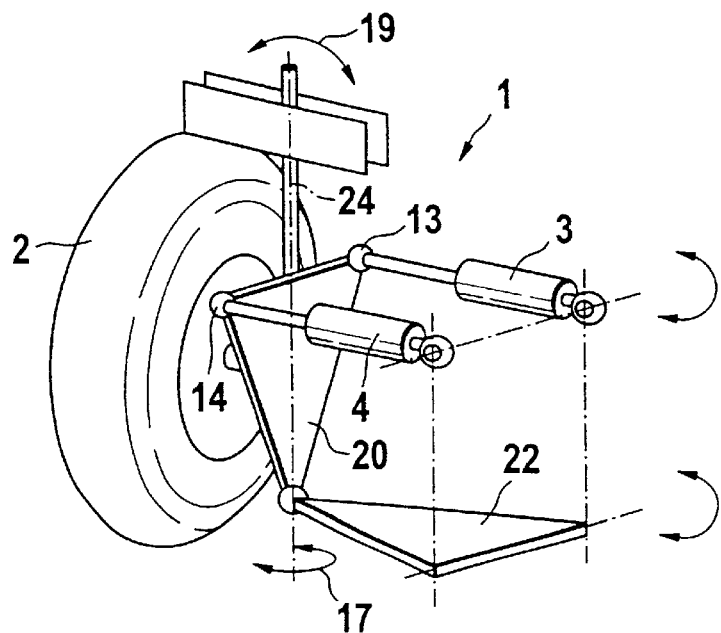

The suspension system 1 according to FIG. 4 comprises two approximately horizontal actuators 3 and 4 which run approximately parallel and are connected via the force application points 13, 14 to an approximately vertical wheel-side steering triangle 20 fastened to a further steering triangle 22. The system possesses two degrees of freedom: the wheel 2 can be steered about its steering axis 24 according to the movement arrow 17 and the wheel camber can be set according to the movement arrow 19. If one actuator fails, steerability can be maintained.

Figure 5:
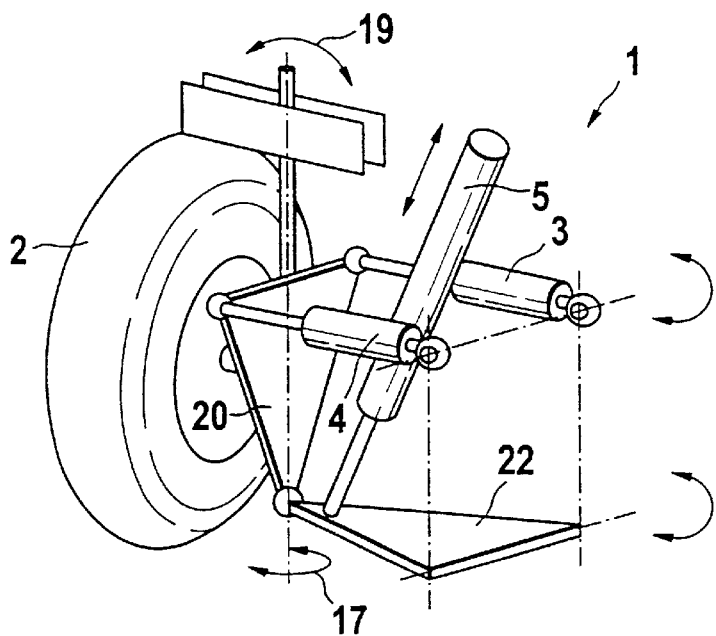

The exemplary embodiment having the suspension system according to FIG. 5 corresponds in its make-up to that according to FIG. 4, but has an additional actuator 5 which, as an additional degree of freedom, allows the compression of the wheel 2. Moreover, there is the possibility of also adjusting the toe of the wheel in addition to steering, camber setting and compression. On account of the coupling of steering and camber setting or of camber setting and toe setting, the number of degrees of freedom amounts to three. There is no risk of distortion of the suspension system 1 as a result of actuators running asynchronously. The version according to FIG. 5, like the version according to FIG. 4, may also be used as an axle module by transferring the arrangement in a mirror image onto the other side of the vehicle, in which case common horizontal actuators can be used, so that identical steering and camber angles can be set on both steerable vehicle wheels.

If one actuator fails, it is put into a detained position. Steerability is not adversely affected by the failure of one actuator, but at all events there is coupling between steering and camber setting.

Figure 5A:
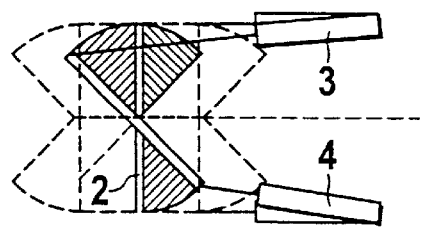

FIG. 5a shows schematically the associated movement space of the wheel 2. When the actuators 3 and 4 are simultaneously elongated in the same direction, the wheel 2 is cambered. In the event of elongation in the opposite direction, the toe of the wheel is set or steering is carried out.

Figure 6:
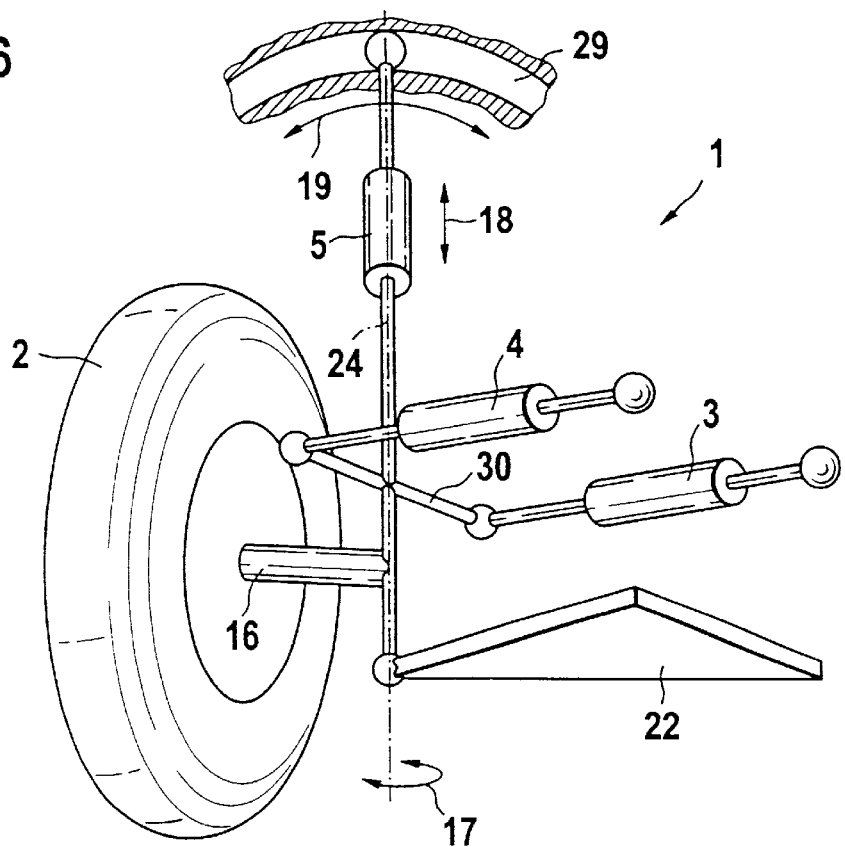
Figure 6A:
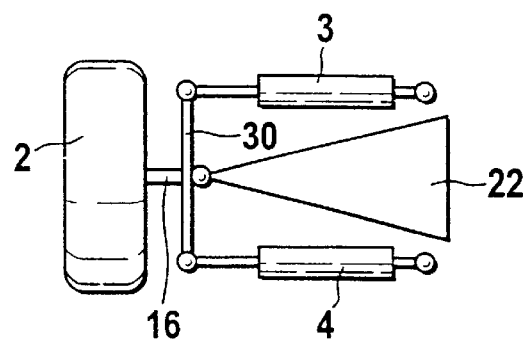
Figure 6B:
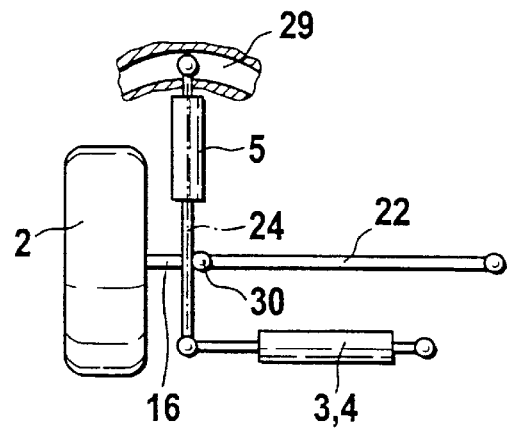

FIGS. 6, 6a and 6b illustrate a modified version of the example from FIG. 5. FIG. 6 is a perspective view, while FIG. 6a a top view and FIG. 6b a side view, but with offset actuators. The suspension system 1 for the wheel 2 comprises two horizontal actuators 3, 4, which engage on a wheel-side transverse link 30, and a vertical actuator 5 on the steering axis 24. The steering axis 24 is connected to the wheel axle 16. The lower end of the steering axis 24 is connected to a steering triangle 22 which is suspended on the body; the upper end of the steering axis 24 is guided movably in a transverse guide 29, in the form of a part circle, which is fastened to the body.

The system possesses the three degrees of freedom comprising steering, compression and camber setting according to the movement arrows 17, 18 and 19. Toe setting is coupled to camber setting. The transverse guide 29 ensures an exact movement of the steering axis 24 during the setting of the camber.

As a comparison of FIGS. 6 and 6b shows, the horizontal actuators 3, 4 arranged in parallel may be arranged both above and below the transverse link 30.

Figure 7:
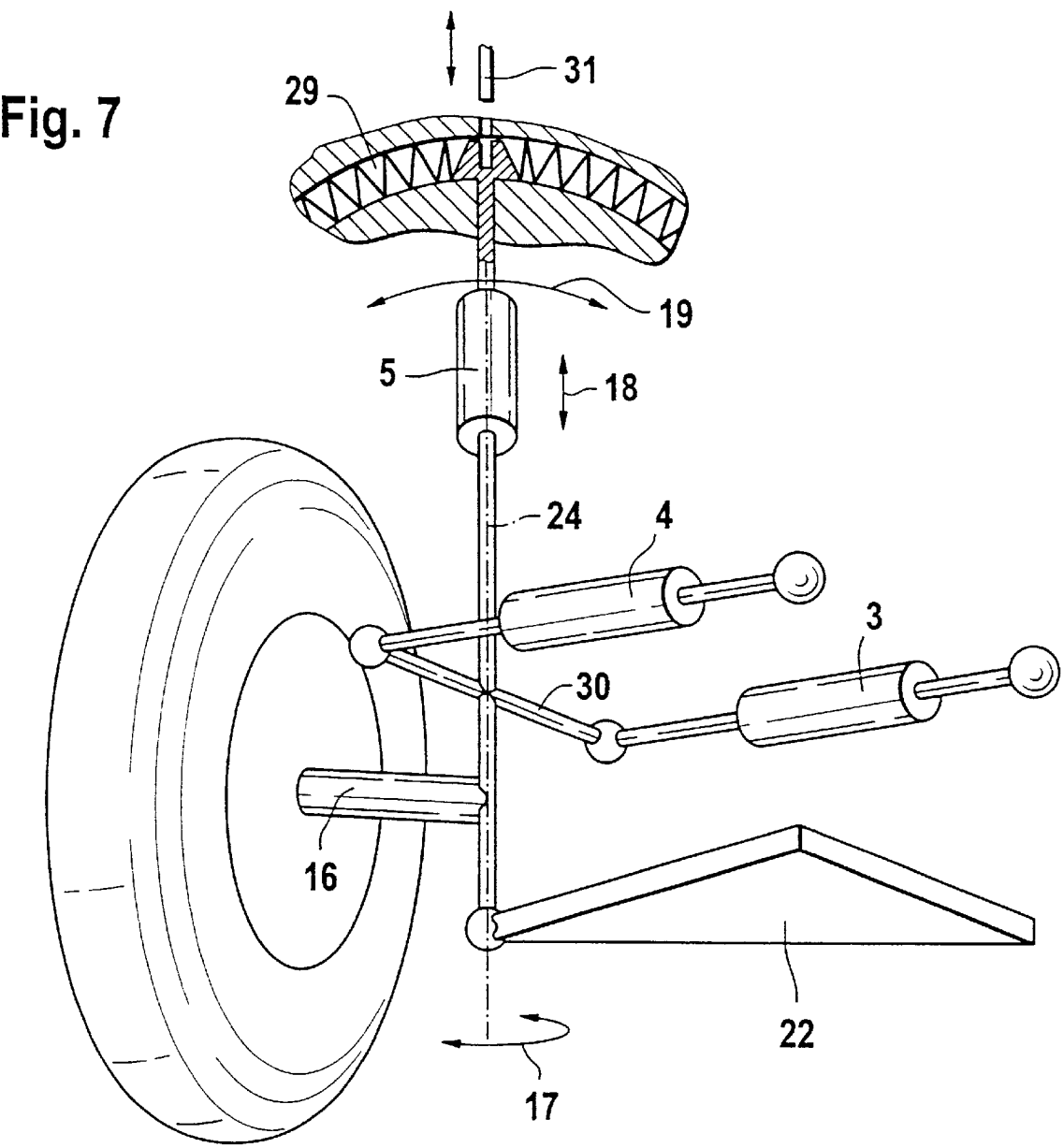

FIG. 7 shows a device similar to that of FIG. 6, but with the difference that the transverse guide 29 can be detained by means of an auxiliary actuator 31, so that the camber movement of the steering axis 24 is blocked.

In the event of a fault, the defective actuator is put into a sliding position, in contrast to the preceding exemplary embodiment. At the same time, the auxiliary actuator is activated and camber movement of the steering axis is prevented. The steering function can be performed without restriction.

Figure 8:
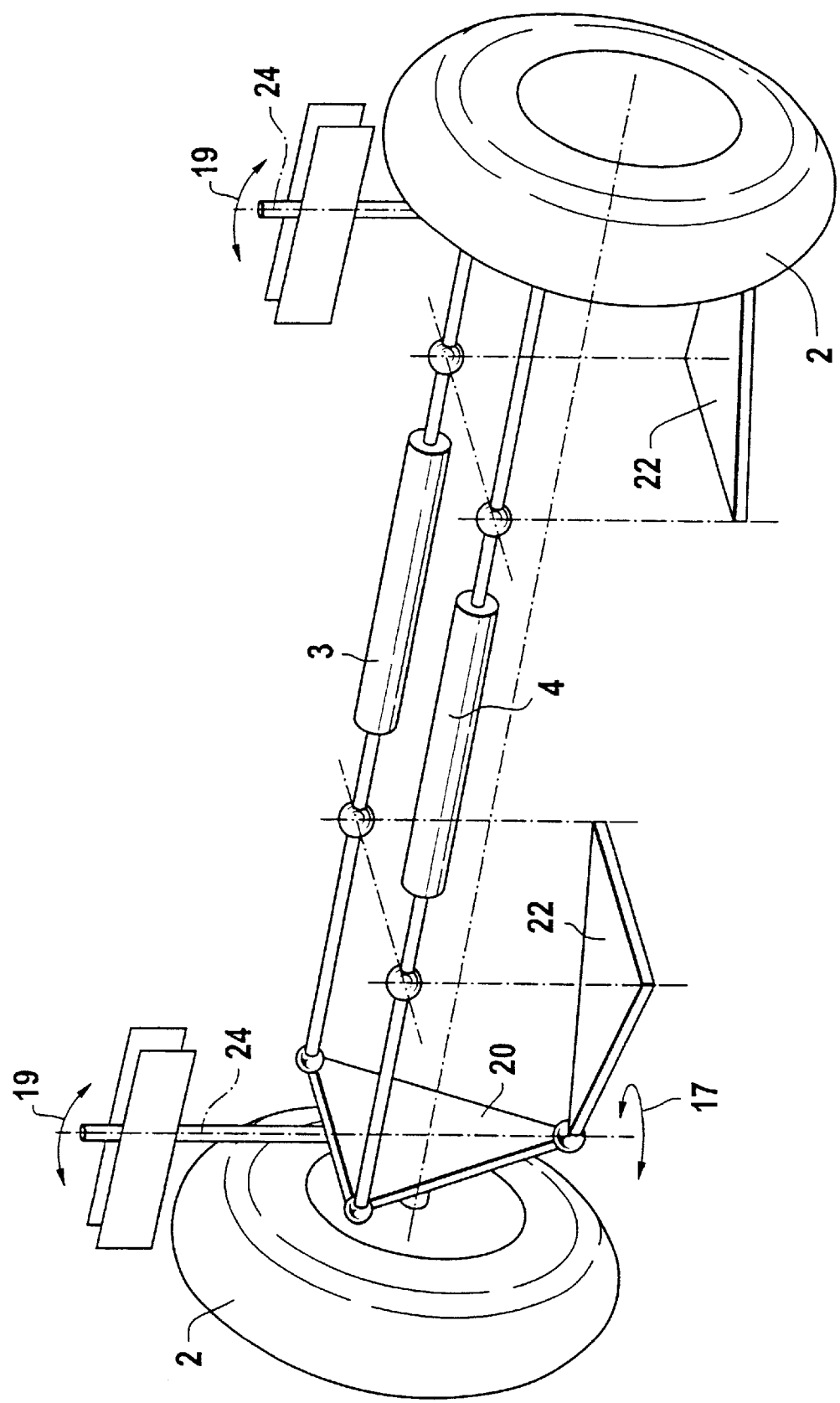

FIG. 8 shows a mirror-symmetrical arrangement of the version according to FIG. 4, with two common actuators 3, 4 for two steered wheels of an axle. On account of the actuators 3, 4 used jointly for both wheels, the entire system with both wheels has only the two degrees of freedom comprising steering and camber setting; these degrees of freedom are executed in the same way for both wheels.

Figure 9:
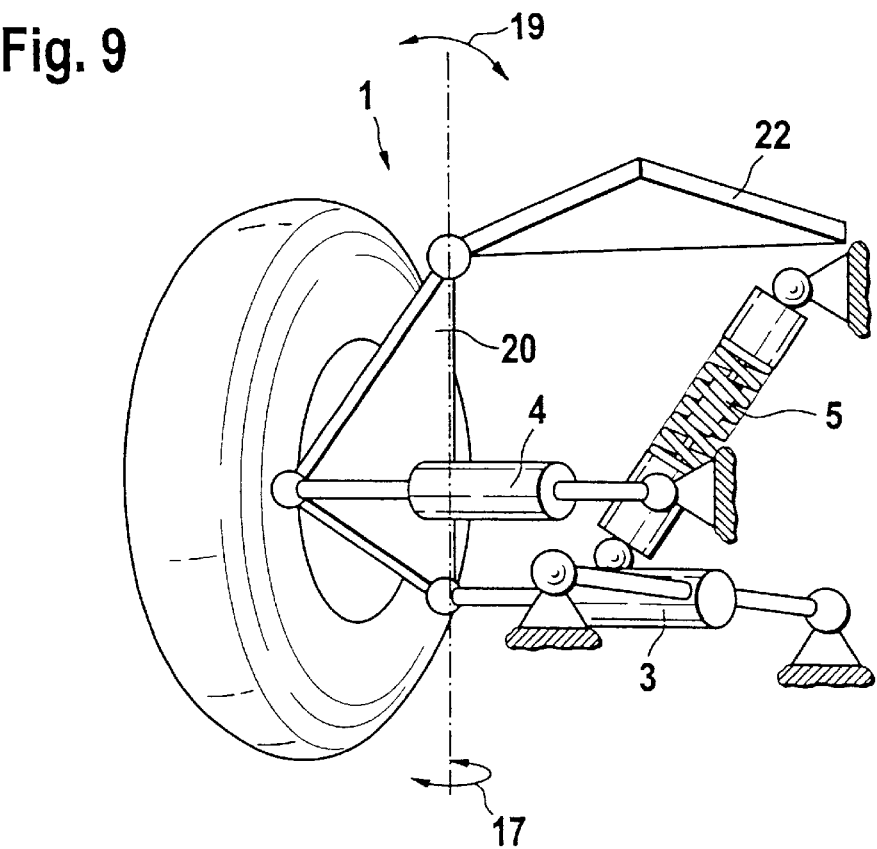

The example shown in FIG. 9 shows the implementation of a steering function with single redundancy. Two actuators 3, 4 running essentially horizontally are provided, which are suspended on the body side and act upon the steering triangle 20. A further actuator 5 running obliquely is connected to the horizontal actuator 3 at a distance from the body-side fastening of the latter. The system can be steered and can be compressed and the camber can be set, with the camber setting being capable of being carried out independently of the steering. Steering may, if appropriate, be carried out via a single one of the three actuators. It is possible to set the camber only by actuating the two horizontal actuators 3 and 4 simultaneously and in the same direction.

In the event of a defect of either actuator 3, 4, the faulty actuator is put into the detained position. Although the wheel 2 can continue to be steered, camber setting is no longer possible.

Figure 10:
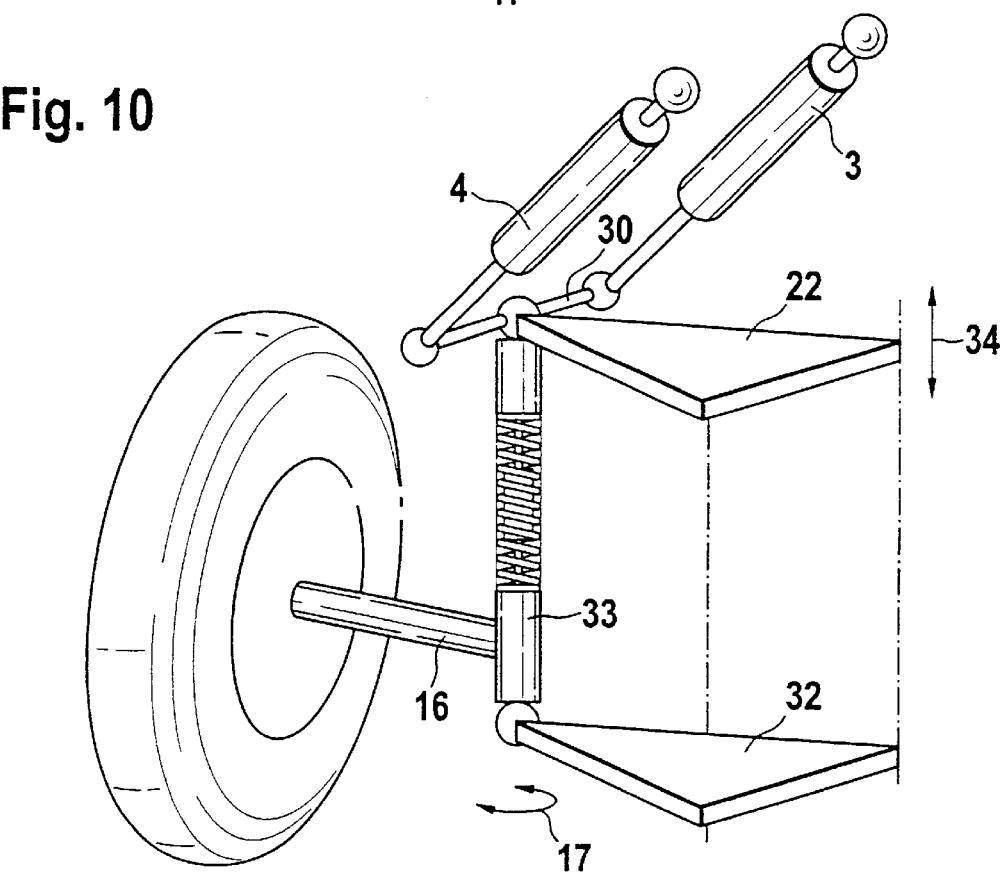

FIG. 10 shows a wheel module with two essentially parallel actuators 3, 4 running obliquely. The actuators 3, 4 act upon a transverse link 30 which is mounted above the wheel axle 16 and which is connected to an upper horizontal steering triangle 22 and, via a passive spring damper element 33, to a lower steering triangle 32. The spring damper element 33 is mounted on the wheel axle 16. The system possesses three degrees of freedom: steering, compression and chamber. The steering and compression movements are coupled, so that a steering movement is converted, as a function of the compression, into a corresponding actuating movement for producing a wheel steering angle, and also independent camber setting.

In the event of a fault, the defective actuator is put into a sliding position. The steering function can continue to be carried out, but as a function of the compression. Distortion of the wheel suspension as a result of actuators running asynchronously is not to be expected.

As a result of the upwards or downwards displacement of the upper steering triangle 22 in the direction of the movement arrow 34, camber setting can likewise be brought about.

Figure 11A:
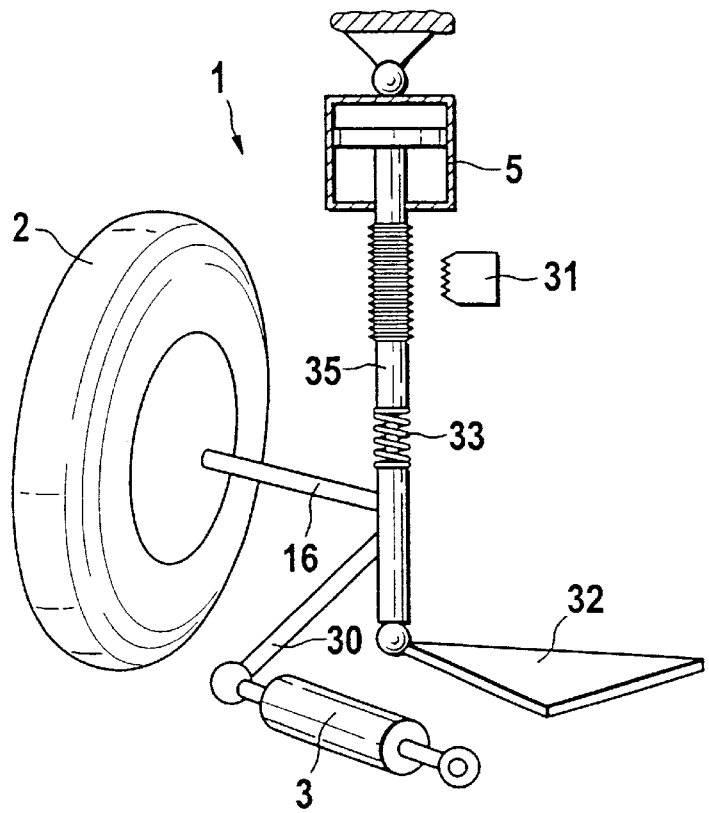
Figure 11B:
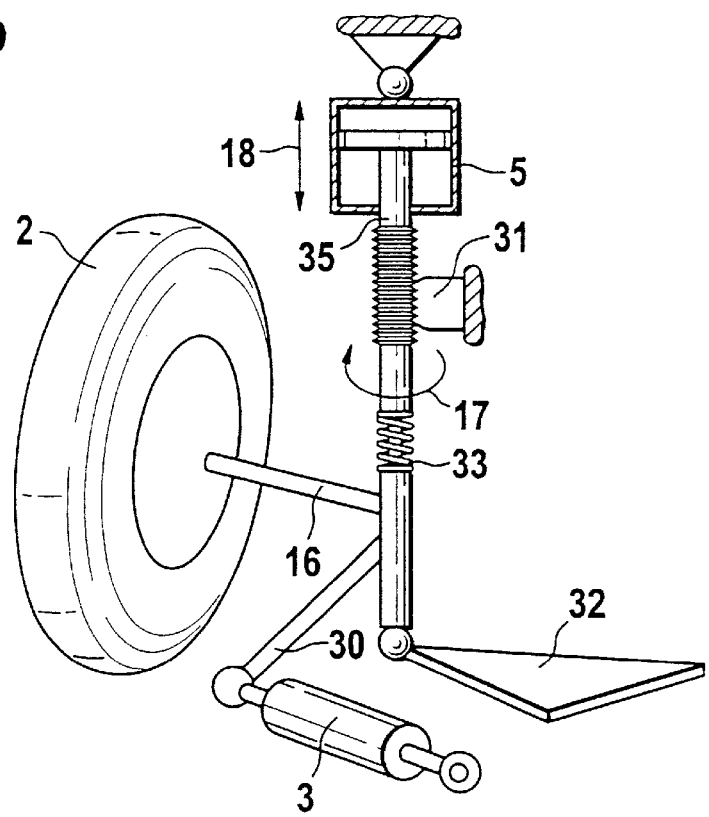

FIGS. 11a and 11b illustrate a further exemplary embodiment. The steering angle is set via a steering actuator 3 which acts on the wheel axle 16 via a transverse link 30. A passive spring damper element 33 is supported on a shock-absorbing strut 35 which is clamped between a body-side support and a lower steering triangle 32. The spring damper element 33 makes it possible to have a vertical compression of the wheel 2 of the suspension system 1 as a further degree of freedom. Furthermore, the upper end of the shock-absorbing strut 35 has arranged on it an actuator 5 which can normally be both detained and activated. With the actuator 5 activated, the compression function is performed via the actuator 5 which is additionally used for the passive spring damper element 33.

In the event of a fault, if the steering actuator 3 fails, the latter is adjusted into the sliding position and the vertical actuator 5 is activated. At the same time, an auxiliary actuator 31 is moved up to the shock-absorbing strut 35 and is brought into engagement with an external thread on the shock-absorbing strut 35, so that an up-and-down movement of the shock-absorbing strut 35 caused by the actuator 5 in the direction of the movement arrow 18 automatically brings about a rotation of the shock-absorbing strut 35. This rotational movement can be converted in a controlled way into a steering movement according to movement arrow 17, but at the expense of active suspension which in this case is assumed solely by the passive spring damper element.

Figure 12:
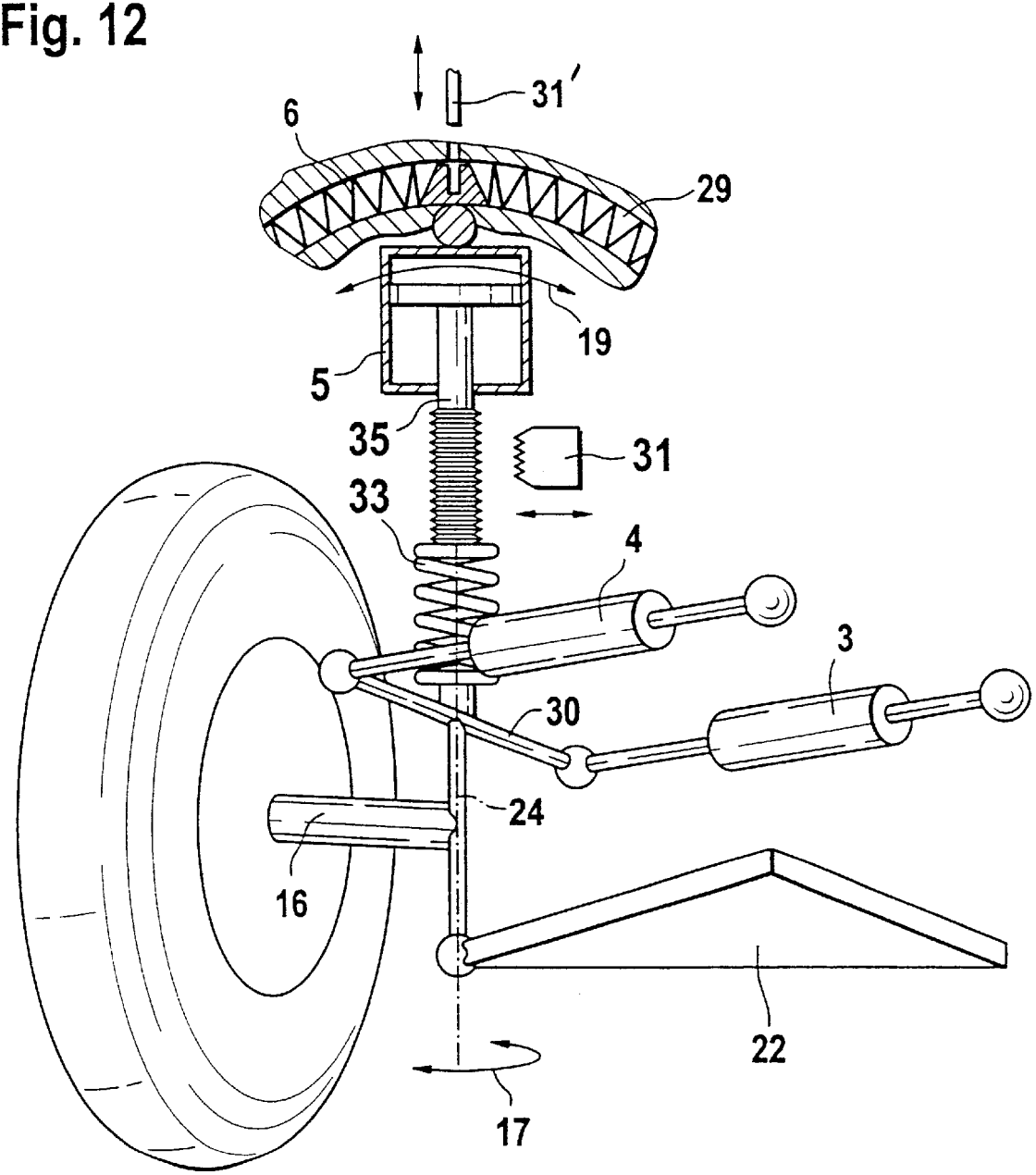

The exemplary embodiment according to FIG. 12 constitutes an extended combination of the examples from FIG. 7 and FIGS. 11a and b. Two parallel horizontal actuators 3, 4 are provided, which act upon a transverse link 30 connected via the steering axis 24 to the wheel axle 16. The vertical shock-absorbing strut 35 is provided with a passive spring damper element 33 and with an actuator 5. Furthermore, an actuator 6 in the transverse guide 29 and two auxiliary actuators 31 and 31' are provided. The first auxiliary actuator 31 can be pushed laterally up to the shock-absorbing strut 35 and, in the bearing position, engages by meshing into an external thread on the shock-absorbing strut 35. In the bearing position, the second auxiliary actuator 31' engages into the transverse guide 29 at the upper end of the shock-absorbing strut 35, whereupon a camber movement in the direction of the movement arrow 19 is blocked. A camber movement can be generated actively as a result of the actuation of the actuator 6 in the transverse guide 29.

Normally, steering can be carried out and the camber can be set via the parallel actuators 3 and 4. Compression can be influenced via the vertical actuator 5. The actuator 6 is either put into the sliding position or synchronized with the camber setting of the parallel actuators 3 and 4.

If one of the two parallel actuators 3 and 4 fails, in a first variant the auxiliary actuator 31', designed as a detent pawl, can snap into a middle position in the transverse guide 29, whereupon steering can be carried out by means of the intact second parallel actuator. The defective actuator is put into the sliding position.

In a second variant, steering and camber setting are coupled, by the defective actuator being put into the detaining position and the drive taking place either via the intact parallel actuator or via the actuator 6 arranged in the transverse guide. In this variant, steering and camber adjustment are coupled.

Should both horizontal parallel actuators 3 and 4 fail, the auxiliary actuator 31 is moved, in a bearing position, onto the external thread of the shock-absorbing strut 35 and the auxiliary actuator 31' is introduced, in the blocking position, into the transverse guide 29. A vertical movement executed by the actuator 5 is converted into a steering movement as a result of the meshing engagement of the auxiliary actuator 31 into the external thread on the shock-absorbing strut 35.

A steering with triple redundancy is achieved by the use of the additional auxiliary actuators 31 and 31'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A regulatable suspension system for an active chassis of a motor vehicle, comprising:

at least two actuators for controlling relative movement between a wheel of the motor vehicle and a vehicle body; and a control unit for generating actuating signals for setting actuating movements of said actuators as a function of input signals representing vehicle state variables; wherein actuating movements which can be generated by the at least two actuators, acting on the wheel, have parallel direction components; and in the event of a failure of one actuator, actuating signals coupling the actuators can be generated to control a degree of freedom previously controlled by the failed actuator, via an intact actuator.

2. The suspension system according to claim 1, wherein pairs of the at least two actuators lie in a common plane.

3. The suspension system according to claim 2, wherein a pair of actuators lying in a common plane are arranged at an angle to one another and have a common intersection point.

4. The suspension system according to claim 2, wherein a pair of actuators lie parallel to one another.

5. The suspension system according to claim 1, wherein two force application points of the at least two actuators, and a further point of articulation, are arranged at respective corner points to define a triangle.

6. The suspension system according to claim 1, wherein, in the event of failure of an actuator, a function of the failed actuator is assumed by an intact actuator, in addition to a primary function assigned to the intact actuator.

7. The suspension system according to claim 1, wherein in the event of a failure of an actuator a primary function of an intact actuator can be eliminated, with the intact actuator assuming a function of the defective actuator.

8. The suspension system according to claim 1, wherein force application points of two cooperating actuators for applying actuating force to the wheel are offset from the steering axis.

9. The suspension system according to claim 8, wherein the force application points of the two cooperating actuators are also offset from a wheel rotation axis.

10. The suspension system according to claim 8, wherein in the event of a failure of an actuator, said control unit operates actuating signals which set a steering angle for the vehicle via a remaining intact actuator.

11. The suspension system according to claim 8, wherein a vehicle steering angle and camber of a wheel can be manipulated via the two cooperating actuators.

12. The suspension system according to claim 8, wherein a vehicle steering angle and toe of a wheel can be manipulated via the two cooperating actuators.

13. The suspension system according to claim 8, wherein a vehicle steering angle and a stroke of the body in relation to a wheel (2) can be manipulated via the two cooperating actuators.

14. The suspension system according to claim 1, wherein in the event of a failure of an actuator, a failed actuator can be detained.

15. The suspension system according to claim 1, wherein in the event of a failure of an actuator, a failed actuator is held in a sliding position.

16. The suspension system according to claim 1, wherein more than two actuators are provided, a force vector of each actuator having a force component which is parallel to a force component of at least one of the other actuators.

17. The suspension system according to claim 1, wherein the actuators comprise hydraulic cylinders.

18. A vehicle suspension apparatus, comprising:

a vehicle wheel;

a plurality of actuators coupling respective force application points associated with the wheel to fastening points on a vehicle body; and a control unit for generating actuating signals for actuating movement of said actuators to control a plurality of degrees of freedom in movement of said wheel; wherein each of said actuators is oriented in space along a directional axis which has a directional component that is parallel to a directional axis of at least one other actuator; and upon failure of an actuator, said control unit controls an intact actuator having a directional axis parallel to a directional component of a directional axis of the failed actuator, to perform a control movement of said wheel that was previously performed by the failed actuator.

19. A vehicle suspension apparatus according to claim 18, wherein, upon occurrence of such a failure, said control unit controls the failed actuator such that it is one of held in a fixed position and movable.

20. A vehicle suspension apparatus according to claim 18, wherein each of said actuators can be actuated to perform a steering function for said vehicle wheel.

* * * * *

UNITED STATES PATENT AND TRADEMARK OFFICE
CERTIFICATE OF CORRECTION

PATENT NO.       : 6,293,561 B1
APPLICATION NO.  : 09/622158
DATED            : September 25, 2001
INVENTOR(S)      : Goetzen et al.

It is certified that error appears in the above-identified patent and that said Letters Patent is hereby corrected as shown below:

On the Title Page, Item (54) Title, lines 1-3: delete "CONTROLLABLE WHEEL SUSPENSION SYSTEM FOR AN ACTIVE RUNNING GEAR OF A MOTOR VEHICLE" and replace with --REGULATABLE SUSPENSION SYSTEM FOR AN ACTIVE CHASSIS OF A MOTOR VEHICLE--.

Column 1, lines 1-3: delete "CONTROLLABLE WHEEL SUSPENSION SYSTEM FOR AN ACTIVE RUNNING GEAR OF A MOTOR VEHICLE" and replace with --REGULATABLE SUSPENSION SYSTEM FOR AN ACTIVE CHASSIS OF A MOTOR VEHICLE--.

Signed and Sealed this

Fifteenth Day of June, 2010

David J. Kappos
*Director of the United States Patent and Trademark Office*